United States Patent
Grover et al.

(10) Patent No.: US 12,034,858 B2
(45) Date of Patent: Jul. 9, 2024

(54) SECURE EXECUTION ENVIRONMENT FOR APPLICATIONS USING BLOCKCHAIN

(71) Applicant: MICRO FOCUS LLC, Santa Clara, CA (US)

(72) Inventors: Douglas Max Grover, Provo, UT (US); Michael F. Angelo, Houston, TX (US); Stephan F. Jou, Quebec (CA)

(73) Assignee: Micro Focus LLC, Santa Clara, CA (US)

( * ) Notice: Subject to any disclaimer, the term of this patent is extended or adjusted under 35 U.S.C. 154(b) by 439 days.

(21) Appl. No.: 17/356,141

(22) Filed: Jun. 23, 2021

(65) Prior Publication Data

US 2022/0417026 A1    Dec. 29, 2022

(51) Int. Cl.
*H04L 9/00* (2022.01)
*G06F 9/445* (2018.01)
*G06F 21/51* (2013.01)
*H04L 9/32* (2006.01)

(52) U.S. Cl.
CPC ............ *H04L 9/3236* (2013.01); *G06F 9/445* (2013.01); *G06F 21/51* (2013.01); *G06F 2221/033* (2013.01); *H04L 9/50* (2022.05)

(58) Field of Classification Search
CPC ......... H04L 9/3236; H04L 9/50; G06F 9/445; G06F 21/51; G06F 2221/033; G06F 21/64; G06F 21/53
See application file for complete search history.

(56) References Cited

U.S. PATENT DOCUMENTS

| | | | |
|---|---|---|---|
| 10,795,977 B2 | 10/2020 | Salomon | |
| 10,826,682 B2 | 11/2020 | Subramaniam | |
| 2018/0176229 A1* | 6/2018 | Bathen | H04L 9/3239 |
| 2019/0340379 A1 | 11/2019 | Beecham | |
| 2020/0042305 A1 | 2/2020 | Su et al. | |
| 2020/0073657 A1* | 3/2020 | Robison | G06F 21/57 |
| 2020/0235943 A1 | 7/2020 | Salimi et al. | |
| 2021/0092127 A1 | 3/2021 | Li et al. | |

FOREIGN PATENT DOCUMENTS

| | | |
|---|---|---|
| CN | 112333208 B | 3/2021 |
| WO | WO-2018119892 A1 | 7/2018 |

OTHER PUBLICATIONS

Yang Xu, et al; A Blockchain-Based Nonrepudiation Network Computing Service Scheme for Industrial IoT; IEEE Transactions on Industrial Informatics, vol. 15, No. 6; Jun. 2019; 10 pages.

* cited by examiner

*Primary Examiner* — Brian F Shaw
(74) *Attorney, Agent, or Firm* — Sheridan Ross P.C.

(57) ABSTRACT

A request to load an application into memory for execution is received. The application is stored in one or more blocks in a blockchain. The application is validated by running a blockchain hash. In response to validating the application by running the blockchain hash, the application is loaded from the blockchain into a memory. The application is then executed in the memory. This provides a secure method of loading an application into memory.

28 Claims, 11 Drawing Sheets

SECURE EXECUTION ENVIRONMENT FOR APPLICATIONS USING BLOCKCHAIN

FIELD

The disclosure relates generally to software and particularly to protecting software from being compromised.

BACKGROUND

Today, software systems are subject to malware attacks and security breaches. Malware attacks/security breaches can occur when the software/configuration information is changed by malicious code. What is needed is a way to ensure that a software system that is being loaded has not been compromised or damaged.

SUMMARY

These and other needs are addressed by the various embodiments and configurations of the present disclosure. The present disclosure can provide a number of advantages depending on the particular configuration. These and other advantages will be apparent from the disclosure contained herein.

A request to load an application into memory for execution is received. The application is stored in one or more blocks in a blockchain. The application is validated by running a blockchain hash. In response to validating the application by running the blockchain hash, the application is loaded from the blockchain into a memory. The application is then executed in the memory. This provides a secure method of loading an application into memory.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed blockchain ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extrallonce field, which is stored as the left most leaf node in the merkle tree. The counter parameter is often small at 32-bits so each time it wraps the extrallonce field must be incremented (or otherwise changed) to avoid repeating work. When validating or verifying a block, the hashcash algorithm repeatedly hashes the block header while incrementing the counter & extrallonce fields. Incrementing the extrallonce field entails recomputing the merkle tree, as the transaction or other information is the left most leaf node. The body of the block contains the transactions or other information. These are hashed only indirectly through the Merkle root. A blockchain, as described herein and in the claims may comprise one or more blockchains.

As described herein and in the claims, the term "application" can include various types of software applications, such as, a web application, a client application, a server application, a browser, a word processing application, a spreadsheet application, an operating system, an email application, a database application, a security application, a network application, an authentication application, and/or the like. An application may comprise multiple applications that are loaded into memory for execution from one or more blocks in a blockchain. An application may comprise libraries, configuration information, scripts, and/or the like. In addition, an application may comprise a container, a virtual machine, an operating system, a driver, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
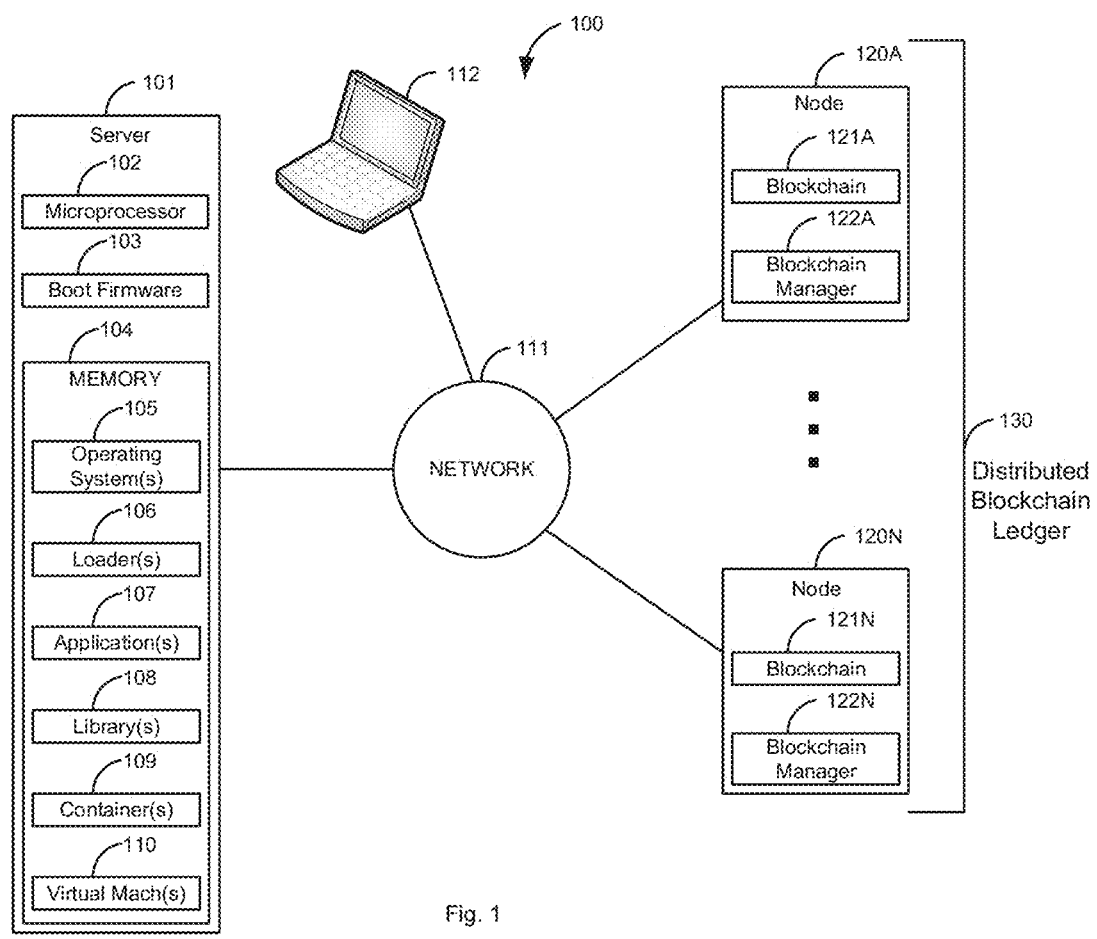
FIG. 1 is a block diagram of a first illustrative system that shows a blockchain in a distributed ledger.

FIG. 1 is a block diagram of a first illustrative system 100 that shows a blockchain 121 in a distributed blockchain ledger 130. The first illustrative system 100 comprises a server 101, a communication device 112, a network 111, and nodes 120A-120N.

The server 101 can be or may include any device that can provide network services on the network 111, such as, web server, a cloud server, an application server, a communication server, an authentication server, and/or the like. The server 101 may be a communication device 112 or any device that can run an application 107. The server 101 further comprises a microprocessor 102, boot firmware 103, and a memory 104.

The microprocessor 102 can be or may include any known hardware processor, such as, a multi-core processor, a microcontroller, an application specific processor, and/or the like. The boot firmware 103 is any firmware that boots up the server 101. The boot firmware 103 is the initial firmware that is used by the server 101 to initiate the loading of various types of operating systems 105, application(s) 107, library(s) 108, container(s) 109, virtual machine(s) 110, and/or the like.

The memory 104 can be or can include any known type of memory, such as, a Random Access Memory (RAM), a flash memory, a hard disk, a RAM disk, and/or the like. The memory 104 comprises an operating system 105, a loader 106, an application(s) 107, a library(s) 108, a container(s) 109, and a virtual machine(s) 110.

The operating system(s) 105 can be or may include any type of operating system 105, such as, a Linux® operating system, a Windows® operating system, an Apple® operating system, an Android® operating system, an embedded operating system, and/or the like. The operating system 105 may comprise multiple operating systems 105 that are running on separate processor cores/threads.

The loader 106 can be any software/firmware that can load the operating system 105, the application(s) 107, the libraries 108, the container(s) 109, and/or the virtual machines 110. The loader 106 may be called by the boot firmware 103 and/or the operating system 105. There may be multiple loaders 106 for each operating system 105, application 107, container 109, and/or virtual machine 110.

The application(s) 107 may be any type of application, such as, a web service, an authentication application, a communication application, a collaboration application, a word processing application, a spreadsheet, a security application, a network application, an email application, a browser, a database, and/or the like. The application(s) 107 may comprise multiple applications 107 that are running concurrently.

The library(s) 108 may be any type of library 108 that may be called by multiple applications 107 (or a single application 107), such as a Dynamic Linked Library (DLL), a static library, a shared library, a class library, and/or the like. The library(s) 108 may comprise multiple different types of libraries 108 that have been loaded into the memory 104.

The container(s) 109 can be or may include any known containers, such as, a managed container, a custom Docker container, a Kubernetes container, an LXC container, a CRI-O container, an rkt container, a podman container, a runC container, and/or the like. The container(s) 109 typically comprise one or more applications 107/libraries 108.

The virtual machine(s) 110 can be or may include any type of virtual machine 110. The virtual machine(s) 110 typically comprise an operating system 105, one or more applications 107, and possibly one or more libraries 108.

The network 111 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 111 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 111 is an electronic communication network configured to carry messages via packets and/or circuit switched communications.

The communication device 112 can be or may include any device that can communicate on the network 111, such as a Personal Computer (PC), a telephone, a cellular telephone, a Personal Digital Assistant (PDA), a tablet device, a notebook device, a smartphone, and/or the like. Although not shown in FIG. 1, any number of communication devices 112 may be connected to the network 111.

The nodes 120A-120N can be or may include any hardware/software that can support the use of blockchains 121 in the distributed ledger 130, such as, a Personal Computer (PC), a server, a trust authority server, a gateway, a router, a network device, a client device, and/or the like. As shown in FIG. 1, any number of nodes 120A-120N may be connected to the network 111. The nodes 120A-120N further comprise blockchains 121A-121N and blockchain managers 122A-122N.

The blockchains 121A-121N are copies of the same blockchain 121 that comprise the distributed blockchain ledger 130. The size of the blockchains 121A-121N may vary based on implementation. The blockchains 121A-121N are a form of a replicated distributed database.

The blockchain managers 122A-122N can be or may include any hardware coupled with software that can manage the blockchains 121A-121N. The blockchain managers 122A-122N work together to determine how to manage the blockchains 121-121N. For example, the blockchain managers 122A-122N may vote to validate a new block 121 being added to the blockchains 121A-121N in the distributed blockchain ledger 130. The blockchain managers 121A-121N may all validate a hash of the blockchain as part of a consensus vote.

Figure 2:
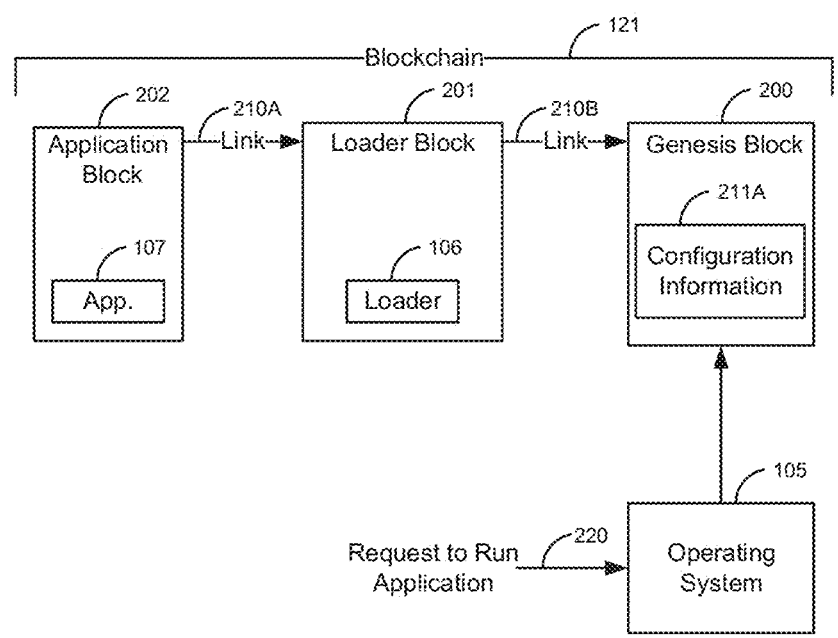
FIG. 2 is a block diagram of a first embodiment of a blockchain for loading an application from the blockchain.

FIG. 2 is a block diagram of a first embodiment of a blockchain 121 for loading an application 107 from the blockchain 121. The blockchain 121 comprises a genesis block 200, a loader block 201, and an application block 202. In FIG. 2 the application 107 does not use any libraries 108, but is a self-contained executable. The blocks 200-202 are linked together using forward links 210A-210B. The forward links are used to verify hashes of the blocks 200-201.

The configuration information 211A may identify where the loader block 201 and the application block 202 are located. The configuration information 211A is static information associated with the application 107/loader 106. The configuration information 211A is used by the loader 106 to load the application 107 into the memory 104 for execution in the memory 104. The configuration information 211A may also comprise installation information about the application 107.

When a user/process wants to run the application 107 in step 220, the hashes of the blockchain 121 are first validated to ensure that none of the blocks 200-202 in the blockchain 121 have been compromised. If the hashes of the blockchain 121 are validated, the loader 106 then loads the application 107 into memory 104 from the application block 202. The loading of the application 107 may include loading configuration information 211A into the memory 104 that is associated with the application 107. The application 107 is then executed in the memory 104. Thus, the application 107, the loader 106, and configuration information 211A have all been validated before the application 107 has been loaded into the memory 104 for execution.

If the hash of the blockchain 121 is not validated, the application 107 is not loaded. An administrator at the communication device 112 may be notified of the failure to validate the hash of the blockchain 121.

In one embodiment, there may be a single application block 202 that contains the loader 106, and the application 107. In this embodiment, the configuration information 211A and/or the application block 202 may contain information to identify where the loader 106/application 107 reside.

Figure 3:
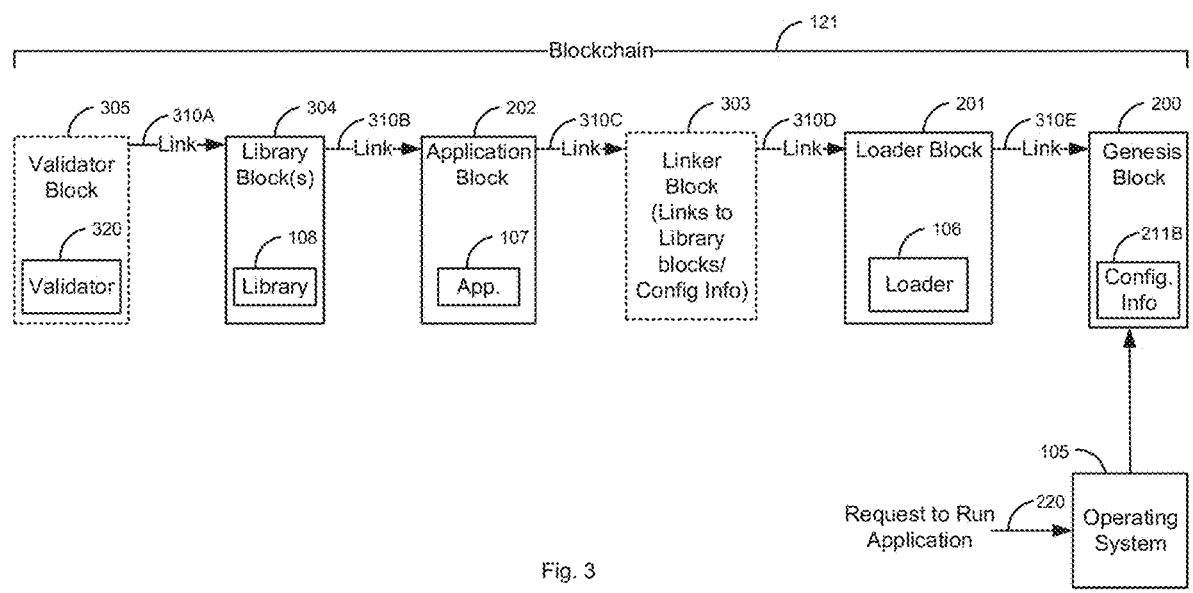
FIG. 3 is a block diagram of a second embodiment of a blockchain for loading an application from the blockchain.

FIG. 3 is a block diagram of a second embodiment of a blockchain 121 for loading an application 107 from the blockchain 121. If the application 107 uses one or more libraries 108, the blockchain 121 is extended to include the library block(s) 304 as shown in FIG. 3. Like in FIG. 2, the blockchain 121 comprises the genesis block 200, the loader block 201, and the application block 202. The genesis block 200 comprises configuration information 211B. The configuration information 211B may be the same or similar to the configuration information 211A.

In addition, the blockchain 121 further comprises a linker block 303 (optional), one or more library blocks 304, and optionally a validator block 305. The linker block 303 has information that allows the loader 106 to load the application(s) 107, library(s) 108, and the validator 320 from the application block 202, the library(s) block(s) 304, and the validator block 305. In one embodiment, the linker block 303 includes the configuration information 211B instead of the genesis block 200 (but the configuration information 211B could still reside in the genesis block 200). The linker block 303 also tells the loader 106 which blocks contains the libraries 108 (e.g., similar to a classpath for Java files). The loader 106 uses the linker block 303 to load the library(s) 108 in the library block(s) 304. In one embodiment, the information in the linker block 303 may be part of the loader block 201. In this embodiment, there would be no linker block 303. In another embodiment, the genesis block 200 may have all the information of the linker block 303. In this embodiment, there would be not a linker block 303.

The library block(s) 304 comprise the library(s) 108. There may be any number of library block(s) 304 depending on which libraries 108 the application needs to load.

Like in FIG. 2, when the application 107 is to be executed, the hashes of the blockchain 121 are first validated. If the any of the hashes are invalid, the application 107 (or the library 108/loader 106) is flagged as being changed and the application 107 is not loaded by the loader 106.

In addition to standard hashing verification, the validator 320 in the validator block 305 may be used to evaluate other properties when the application 107 is loaded or once the application 107 is running. For example, there may be a signature of variables to identify if the application 107 has not been compromised after it has been loaded into memory 104. In addition, the initialization of variables may be tracked by the validator 320 and compared to a known signature of initialized variables. The validator 320 may monitor writes to the memory space of the application 107/libraries 108 while the application 107/library(s) are running to identify if the loaded application 107 has been hacked.

The linker block 303 may also be included where there are no libraries 108/library blocks 304. In this embodiment, the linker block 303 may only have stored configuration information (e.g., configuration information 211B). In this embodiment, the configuration information 211B is not be included in the genesis block 200.

Since the all the code associated with the application 107 (the loader 106, the application 107, the libraries 108, and the configuration information 211B) are all stored in the blockchain 121, this prevents any tampering before the application 107 is loaded into memory 104. Because of the blockchain structure, it is difficult to hack the application 107.

In another embodiment, instead of the application 107/libraries 108 being stored in the blockchain 121, the blocks 202/304 contains a link to the application 107/libraries 108. The hashes in the blockchain 121 are used to validate the code that is pointed to by the links.

In one embodiment, the blockchain 121 is created all at once. This may include where the blockchain 121 is created as part of an installation program. During the installation process, the user may define where the nodes 120A-120N in the distributed blockchain ledger 130 where the blockchain 121 will be created.

In some cases, the libraries 108 may already reside on the server 101. For example, the application 107 may use a known Dynamic Link Library (DLL) that is already on the server 101. In this case, while creating the blockchain 121, the loader 106 will validate the libraries 108 that are already installed on the server 101 before loading the application 107 from blockchain 121 into the memory 104. In this embodiment, the configuration information 211B and/or the linker block 303 may have information on different versions of the library(s) 108. For example, if there are two different versions of the library 108 that are known to work with the application 107, the loader 106 may validate the current library 108 to make sure that it is one of the two versions. This is done based on a hash that is stored in the configuration information 211B/linker block 303 that is a known hash for the library 108. This configuration is where the blockchain 121 contains some code fully in the blockchain 121 and links to other parts, such as the libraries 108 where the hashes of the libraries 108 are already known before creating the blockchain 121.

Another option would be to include multiple versions of the application 107 in the blockchain 121. For example, each block (e.g., 201-202/303-305) in the blockchain 121 may have a version number. If a new version of the application 107 is created, blocks for the new version can be appended to the end of the current blockchain 121 (a new loader block 201, linker block 303, application block 202, library block(s) 304, and validator block 305). The new blocks have the new version. Thus, if someone wanted to load a specific version, the system would execute the appropriate loader 106 for the particular version. Alternatively, each version may be in a separate blockchain 121.

In one embodiment, there may be a single application block 202 that contains the loader 106, the application 107, the library(s) 108, and the validator 320 (or any combination of blocks). In this embodiment, the configuration information 211B and/or the application block 202 may contain information to identify where the loader 106/application 107/library(s) 108/validator 320 reside.

Figure 4:
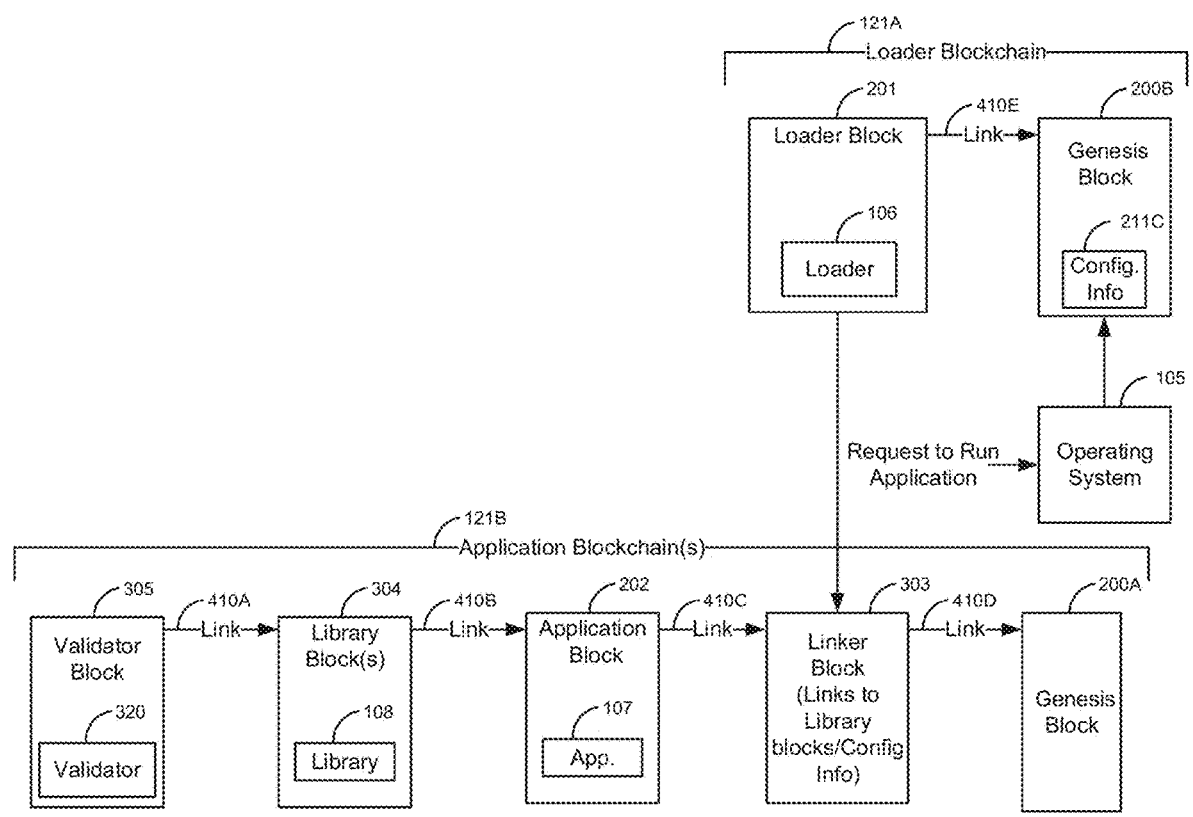
FIG. 4 is a block diagram of a loader blockchain and an application blockchain.

FIG. 4 is a block diagram of a loader blockchain 121A and an application blockchain 121B. In this embodiment, the loader 106 is a generic loader 106 that can load any application 107. When the request to run the application 107 is received, information about what application 107 to load is passed to the loader 106 in the request. Based on the request to run the application 107, the loader blockchain 121A is verified. Likewise, the application blockchain 121B is verified.

The loader 106 from the loader block 201 in the loader blockchain 121A then loads the application 107 in a similar manner as described above. The linker block 303 will be in a defined format that allows the loader 106 to load the application(s) 107. This way, the loader 106 can load any application 107 based on the defined format. The advantage to this embodiment is that it does not have to have the loader 106 in every application blockchain 121B. This reduces the size of the application blockchains 121B. The process of FIG. 4 will work for the blockchains 121 of FIGS. 2 and 3 where the loader block 201 is moved to the loader blockchain 121A.

A key advantage to this implementation is that it can be used for all applications 107 that are loaded. Likewise, it provides a secure environment where all applications 107 are loaded securely from by the same loader 106 in the blockchain 121A.

Alternatively, the linker block 303 in each application blockchain 121B can have a link to the same loader 106, which is covered by the hash of the loader 106 (similar to the external libraries 108 discussed above). In this embodiment, there is only one loader 106 that each application 107 uses as its generic loader 106. In this embodiment, there is not be a loader blockchain 121A.

In another embodiment, the application 107, libraries 108, loader 106, configuration information 211C, links 401A-401E, and/or validator 320 (depending on how the application 107 is configured) all are all in a single block in the application blockchain 121B or some of the blocks are merged into one block. The single block may have links to the particular code/data that are covered by the hash of the block. In this embodiment there would be a genesis block 200 and a single application block 202 that contained all the linker block 303 data, the application 107, the library(s) 108, and the validator 320.

The process of FIGS. 2-4 can be extended to a cloud environment where the application 107 is stored in a single blockchain 121 (FIGS. 2 and 3) or two blockchains 121A-121B (FIG. 4) and are loaded on multiple virtual machines 110 and/or into multiple containers 109 using the blockchain(s) 121. Thus, the integrity of each application 107 that is loaded in the cloud environment is ensured. The idea prevents malware infected code to be loaded and propagated in a cloud/tenant environment.

If compromises to the blockchain 121 are detected, additional blocks could be dynamically added to the end of the blockchains 121 of FIGS. 2-4 that indicate how the blockchain 121 was compromised. The new block can include information, such as, the date, what was compromised or damaged (i.e., a library 108, application 107, configuration information 211A-211C, the node 120 where the blockchain 121 was compromised, etc.), who tried to change the blockchain 121, and/or the like. This allows for tracking and alerting of any malicious activities. It may also be used to detect when a block has become corrupted.

Figure 5:
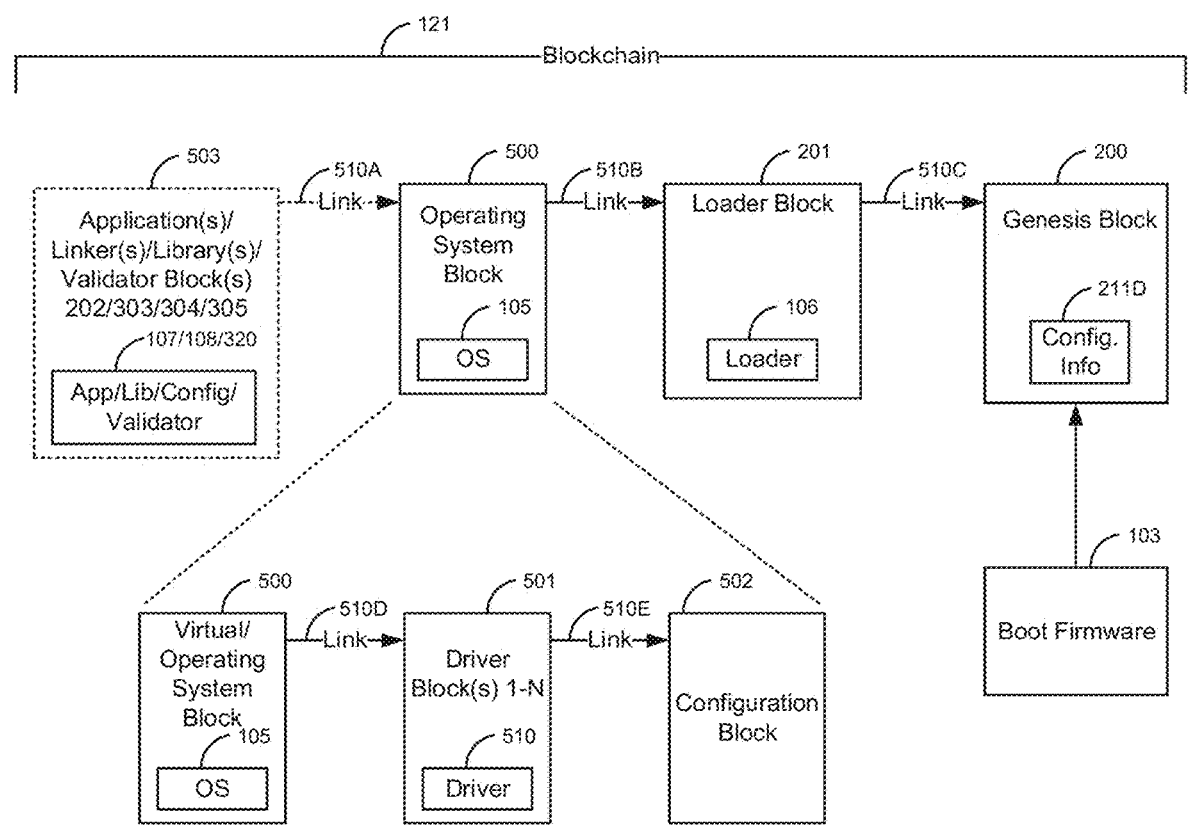
FIG. 5 is a block diagram of a blockchain for loading an operating system and one or more applications from the blockchain.

FIG. 5 is a block diagram of a blockchain 121 for loading an operating system 105 and one or more applications 107 from the blockchain 121. In FIG. 5, the blockchain 121 comprises the genesis block 200 (including configuration information 211D), the loader block 201, an operating system block 500 and the application/linker/library/validator blocks 202/303/304/305 (collectively referred to as 503). The blocks 202/303/304/305/500/201/200 are linked together by links 501A-101C.

The operating system block 500 comprises the operating system 105. The operating system 105 may be a regular operating system 105 or a virtual operating system 105 that is part of a virtual machine 110. In addition, the operating system block 500 may further comprise one or more driver blocks 501 and a configuration block 502. In one embodiment, the configuration block 502 may be part of the operating system block 500. The blocks 500, 501, and 503 are linked together by the links 501D-501E.

The driver block(s) 501 may include any drivers 510 that are used by the operating system 105, such as, a motherboard driver, a network card driver, a backup driver, a video card driver, a sound card driver, a virtual driver, a disk driver, a kernel loadable driver, and/or the like. The configuration block 502 contains information about how to load the operating system 105/drivers 510 from the blockchain 121.

When the system boots up with the boot firmware 103, the boot firmware 103 goes to the blockchain 121 (the genesis block 200) and verifies that the hashes of the blockchain 121 are valid. If valid, the loader 106 is loaded into the memory 104 and is then executed. The loader 106 then loads the operating system 105/drivers 501 using the information in the configuration block 502 into the memory 104 from the blockchain 121. Once the operating system 105 is loaded and executed, the application 107/libraries 108/validator 320 (503) are then loaded and executed as described previously.

Figure 6:
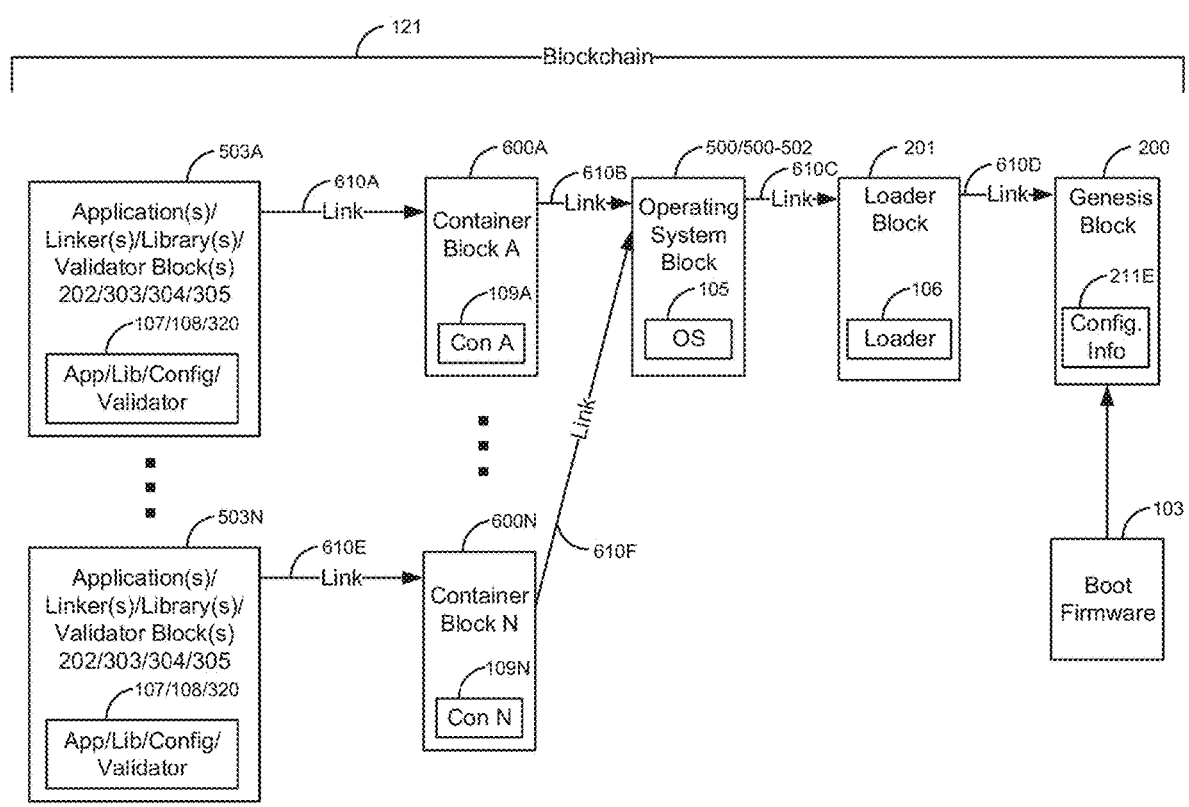
FIG. 6 is a block diagram of blockchain for loading an operating system and one or more containers.

FIG. 6 is a block diagram of blockchain 121 for loading an operating system 105 and one or more containers 109. In FIG. 6, the blockchain 121 comprises the genesis block 200 (including configuration information 211E), the loader block 201, and the operating system block 500 (which may include the driver block(s) 501 and the configuration block 502). In addition the blockchain 121 includes N number of branches. Each branch is for a container 109 that is loaded by the operating system 105 from the blockchain 121 into the memory 104. The blockchain 121 is linked together by links 610A-610E. Alternatively, each branch could be a separate blockchain 121.

The first branch contains the container block 600A and the application(s)/linker/library(s)/validator blocks 202/303/304/305 (collectively 503A). Likewise, the Nth branch comprises the container block 600N and the application(s)/linker/library(s)/validator blocks 202/303/304/305 (collectively 503N). The container blocks 600A-600N comprise containers 109A-109N. Both the container blocks 600A-600N have links 610B/610F to the operating system block 500.

In one embodiment, the blocks 503A-503N may be a docker image (a single docker image). The docker image comprises the application 107, libraries 108, configuration information, dependencies and other files necessary to load the application 107 into the container 109.

When the system boots up, the boot firmware 103 validates the hashes on the blockchain 121 (including each branch). This includes the braches that comprise the container blocks 600A-600N and the blocks 503A-503N. If the hash is valid, the loader 106 is loaded and executed. The loader 106 then loads the operating system 105 into the memory 104 from the blockchain 121. The loader 106/operating system 105 then loads the containers 109A-109N along with the application 107/libraries 108/validator (320 503A-503N) or the docker images into the memory 104 from the blockchain 121.

Figure 7:
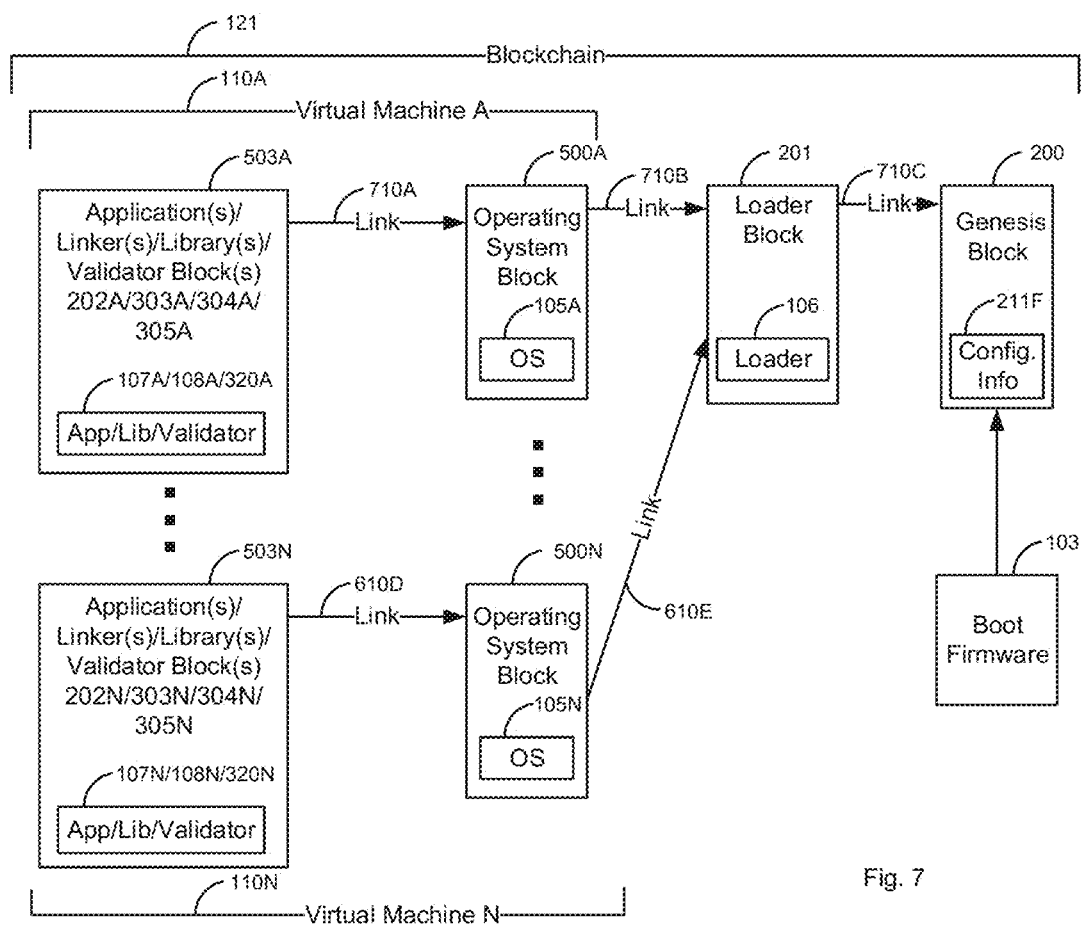
FIG. 7 is a block diagram of a blockchain for loading one or more virtual machines from the blockchain.

FIG. 7 is a block diagram of a blockchain 121 for loading one or more virtual machines 110A-110N from the blockchain 121. The blockchain 121 comprises the genesis block 200 (including configuration information 211F) and the loader block 201. In addition, the blockchain 121 comprises N braches for each virtual machine 110A-110N that is to be loaded from the blockchain 121 into the memory 104 and then executed in the memory 104. The N branches comprise operating system blocks 500A-500N and the application(s)/linker/library(s)/validator blocks 202/303/304/305 (503A-503N). In one embodiment, each branch may be in a separate blockchain.

When the system boots up, the boot firmware 103 validates the hashes in the blockchain 121 (including the branches). If the hashes of the blockchain 121 are valid, the loader 106 is loaded into the memory 104 from the blockchain 121 and executed. The loader 106 then loads the virtual machines 110A-110N (including the operating systems 105A/105N and the application(s)/linker/library(s)/validator blocks 202/303/304/305 (503A-503N) into the memory 104 from the blockchain 121. The virtual machines 110A-110N are then executed in the memory 104.

Figure 8:
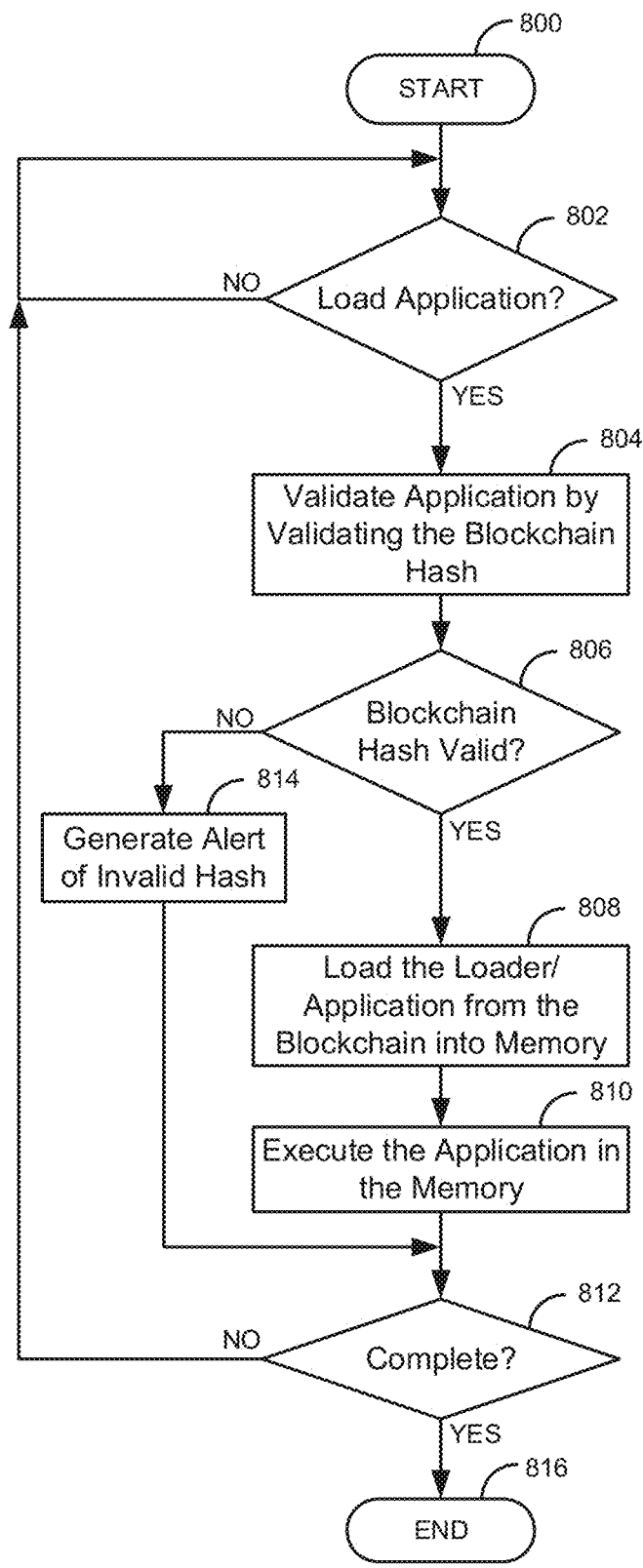
FIG. 8 is a flow diagram of a process for loading an application from a blockchain.

FIG. 8 is a flow diagram of a process for loading an application 107 from a blockchain 121. Illustratively, the server 101, the boot firmware 103, the operating system 105, the loader 106, the application 107, the library 108, the container 109, the virtual machine 110, the communication device 112, the node 120, the blockchain 121, and the blockchain manager 122 are stored-program-controlled entities, such as a computer or microprocessor 102, which performs the method of FIGS. 8-11 and the processes described herein by executing program instructions stored in a computer readable storage medium, such as the memory 104 (i.e., a computer memory, a hard disk, and/or the like). Although the methods described in FIGS. 8-11 are shown in a specific order, one of skill in the art would recognize that the steps in FIGS. 8-11 may be implemented in different orders and/or be implemented in a multi-threaded environment. Moreover, various steps may be omitted or added based on implementation.

The process starts in step 800. The process determines, in step 802, if an application 107 is to be loaded. If an application 107 is not to be loaded in step 802, the process of step 802 repeats. Otherwise, if the application 107 is to be loaded in step 802, the process validates the application 107 by validating the blockchain hash in step 804. If the blockchain hash is not valid in step 806, the process generates an alert of an invalid hash in step 814. For example, an administrator of the blockchain 121 may be notified via the communication device 112. The alert may identify the specific block where the hash was invalid. For example, the alert may identify a specific library 108 or driver 501 that had an invalid hash. The process then goes to step 812.

If the blockchain hash is valid in step 806, the process loads the loader 106 from the blockchain 121 and then the loader 106 loads the application 107 from the blockchain 121 in step 808. The application 107 is then executed in the memory 104 in step 810.

The process determines, in step 812, if the process is complete. If the process is not complete in step 812, the process goes back to step 802. For example, the process will go to step 802 to wait to load another application 107 from another blockchain 121. Otherwise, if the process is complete in step 812, the process ends in step 816.

Figure 9:
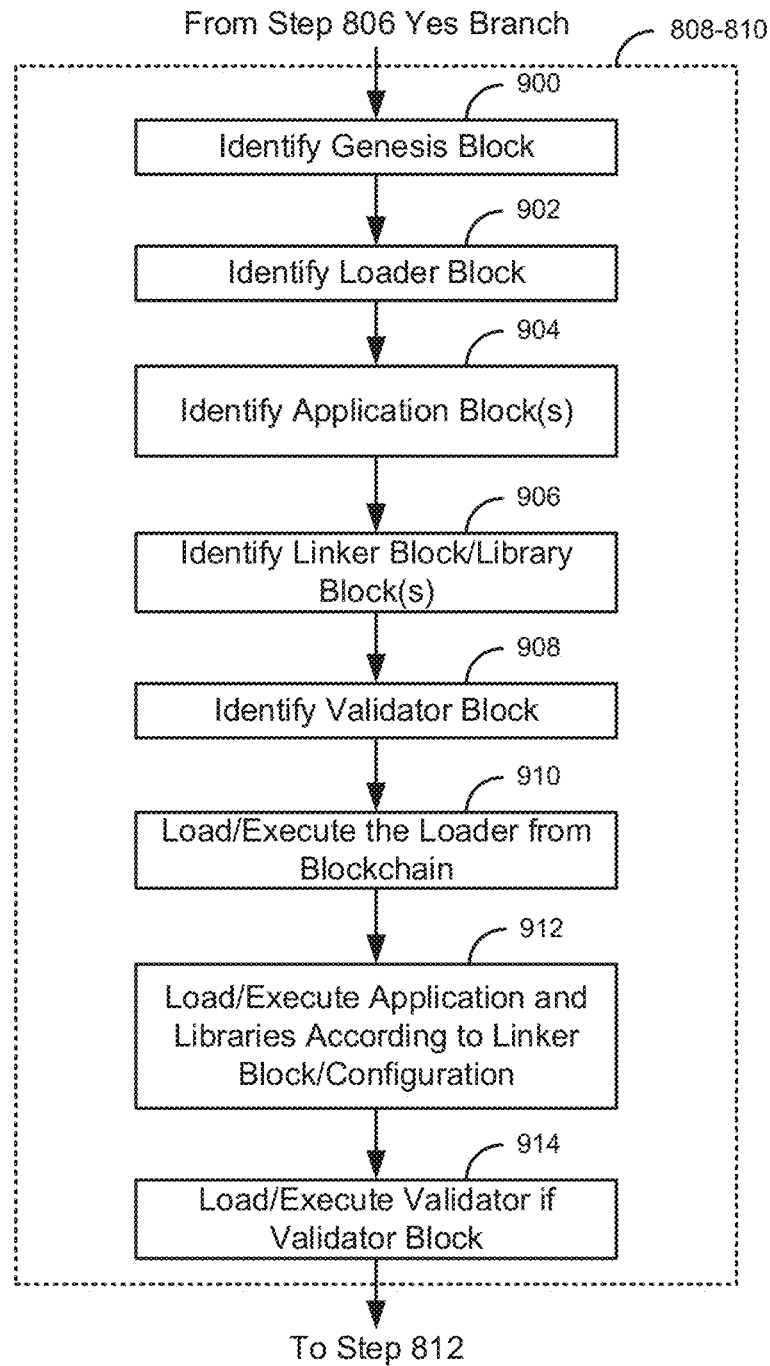
FIG. 9 is a detailed flow diagram of a process for loading an application from a blockchain.

FIG. 9 is a detailed flow diagram of a process for loading an application 107 from a blockchain 121. The process of FIG. 9 is an exemplary embodiment of steps 808-810 of FIG. 8.

After determining that the blockchain 121 has a valid hash in step 806, the process identifies the genesis block 200 in step 900. Based on the genesis block 200 (e.g., the configuration information 211), the process identifies the loader block 201 in step 902. The process identifies the application block(s) 202 in step 904. The process identifies the linker block 303/library(s) block 304 (if any) in step 906. The process identifies the validator block 320 (if there is one) in step 908. The loader 106 is then loaded from the blockchain 121 into the memory 104 and then executed in the memory 104 in step 910. The loader 106 then loads/executes the application 107 and library(s) 108 (if there are any) from the blockchain 121 according to the linker block 303/configuration information (211) in step 912. The loader 106 then loads/executes the validator 320 (if there is one) from the validator block 305 in the blockchain 121 in step 914. The process then goes to step 812.

Figure 10:
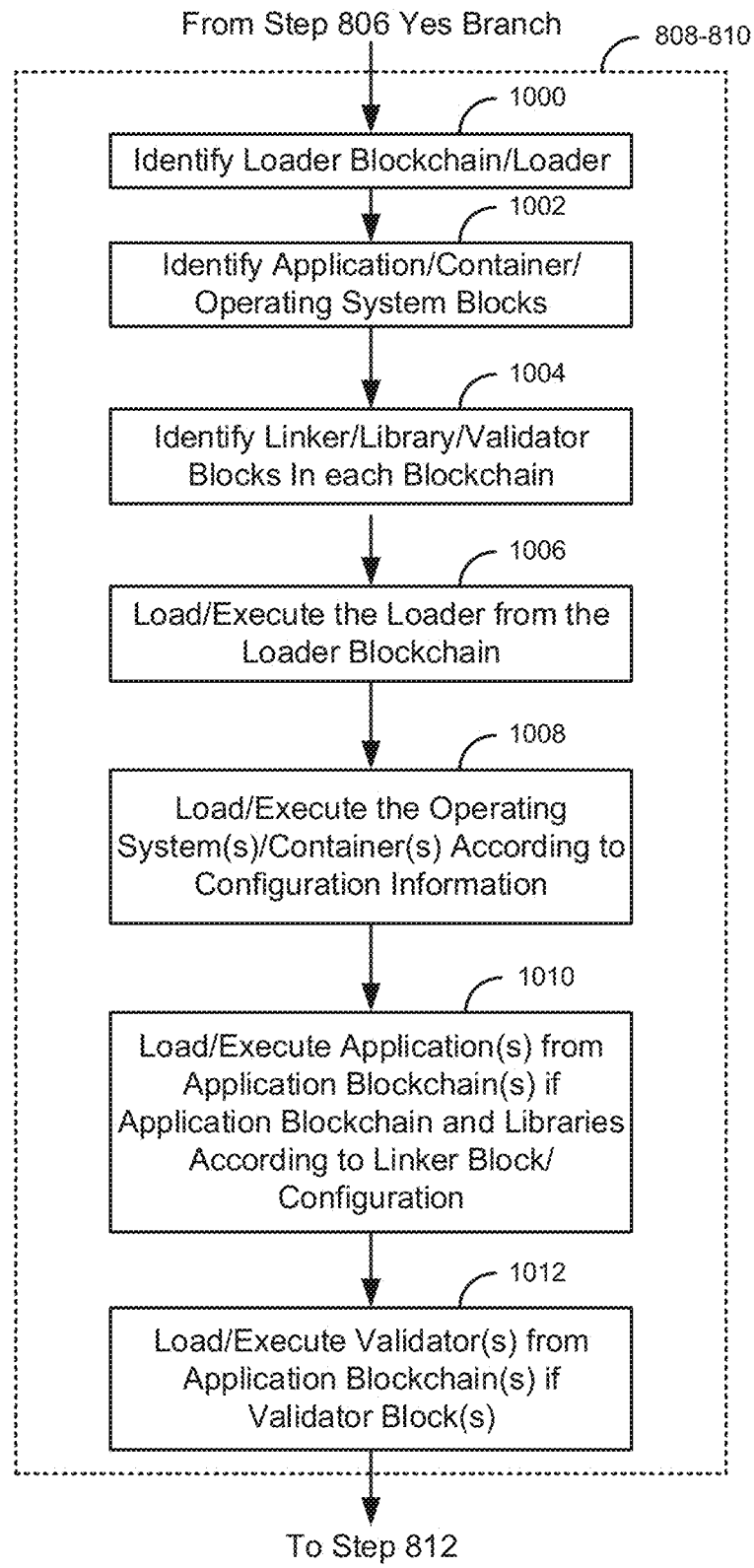
FIG. 10 is a flow diagram of a process for loading an operating system/application/container from a loader blockchain.

FIG. 10 is a flow diagram of a process for loading an operating system 105/application 107/container 109/from a loader blockchain 121A. The process of FIG. 10 is an exemplary embodiment of steps 808-810 of FIG. 8.

After determining that the blockchains 121A-121B have valid hashes in step 806, the process identifies the loader blockchain 121A and the loader 106 in step 1000. The process identifies the application block(s) 202, the container(s) block(s) 600, and the operating system block(s) 500 (e.g., in each branch or separate blockchain 121) in step 1002. The process identifies the linker block(s) 303, the library block(s) 304, and the validator block(s) 305 in the branch/blockchain 121B in step 1004.

The process then loads the loader 106 from the loader blockchain 121A into the memory 104 and then executes the loader 106 in the memory 104 in step 1006. The process then loads and executes the operating system(s) 105/container(s) 109 from the branch/blockchain 121B according to the configuration information 211 in step 1008. The loader 106 loads the application(s) 107/library(s) 108 from the application blockchain 121B into the container 109 in step 1010. Step 1010 may comprise loading a docker image. The application(s) 107/library(s) 108 (if there are libraries 108) are then executed in the memory 104 in step 1010. The loader 106 loads the validator 320 (if there is one) from the validator block 305 in the blockchain 121B into the memory 104 in step 1012. The validator 320 is then executed in the memory 104 in step 1012. The process then goes to step 812.

The process of FIG. 10 is described where there is a separate loader blockchain 121A and an application blockchain 121B. However, the process of FIG. 10 may also work where there is a single blockchain 121.

Figure 11:
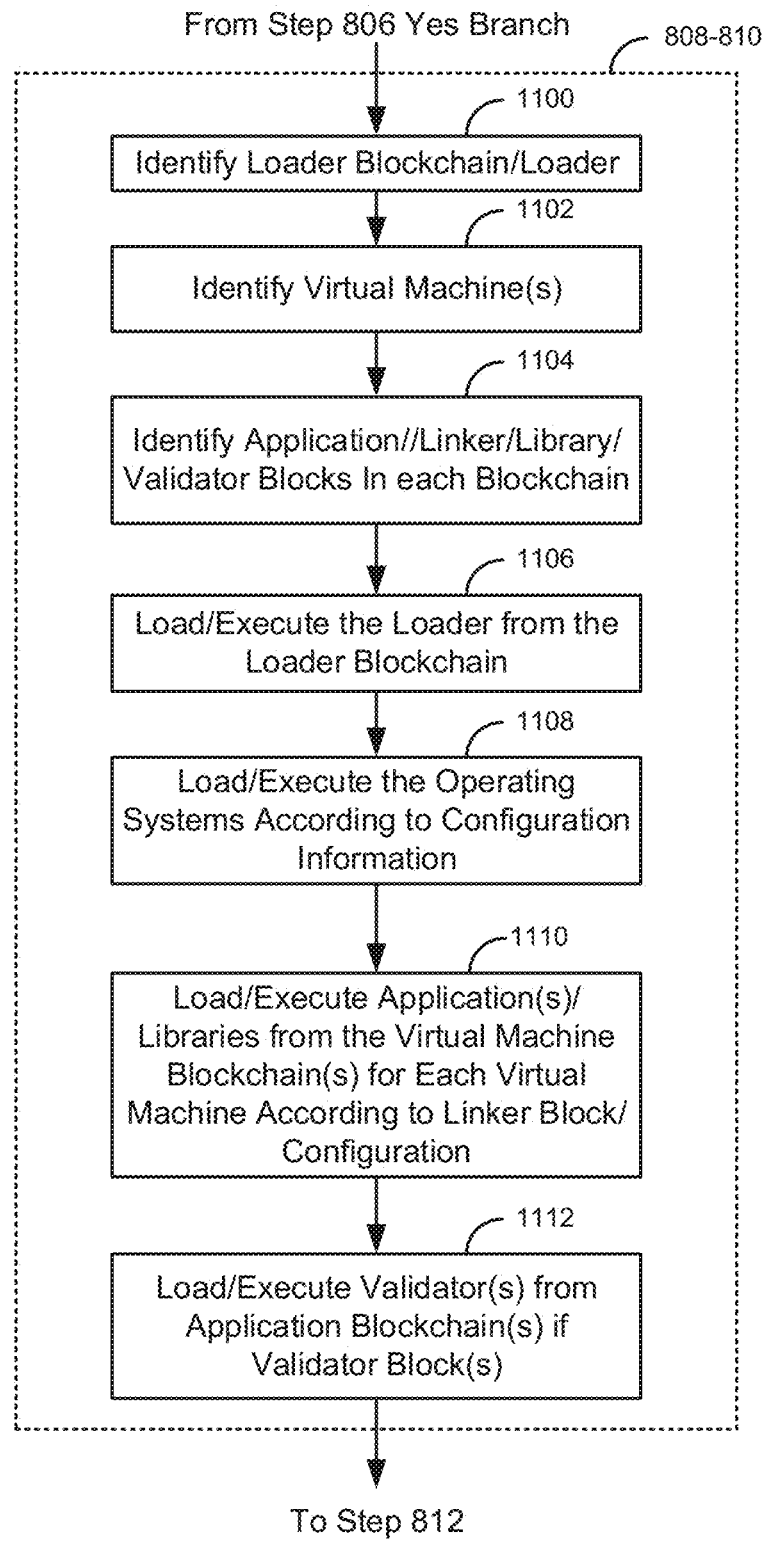
FIG. 11 is a flow diagram of a process for loading one or more virtual machines from a blockchain.

FIG. 11 is a flow diagram of a process for loading one or more virtual machines 110 from a blockchain 121. After determining that the blockchains 121A-121B have valid hashes in step 806, the process identifies the loader blockchain 121A and the loader 106 in the loader block 201 in step 1100. The process identifies, in step 1102, the virtual machine 110A-110N in the blockchain 121 (e.g., as described in FIG. 7). The identification of the virtual machine blocks (e.g., 500A/503A-500N/503N) can be based on the configuration information 211F in the genesis block 200, based on information in the loader block 201, and/or the like. In one embodiment, the virtual machines 110A-110N may each have their own blockchain 121. The process then identifies the application blocks 202A-202N, the linker blocks 303A-303N, the library blocks 304A-304N, and the validator blocks 305A-305N for each virtual machine 110A-110N in the blockchain 121 in step 1104.

The loader 106 is then loaded from the blockchain 121A into the memory 104 and then executed in step 1106. The operating systems 105A-105N are loaded into the memory 104 from the individual branches/blockchains 121 and then executed in step 1108. The applications 107A-107N and the libraries 108A-108N are loaded from the individual branches/blockchains 121 for each virtual machine 110A-110N into the memory 104 from the blockchain 121. The applications 107/libraries 108 may be different for each virtual machine 110A-110N. The validators 320A-320N are loaded from the branches/blockchains 121 into the memory 104 in step 1112. The process then goes to step 812.

The process described herein may work with any kind of code/executables, such as binaries compiled from C/C++ code, runtime code (e.g., Java code), JavaScript, JSON, HTML, shell scripts, and/or the like.

As described herein, the blockchains 121 are shown as being validated using a forward hash. However, in other embodiments, the blockchain 121 may be validated using the forward hash, a reverse hash, a second forward hash, and/or the like. By providing more than one type of hash, this can eliminate any type of hash collisions. Hash collisions are were two different sets of data produce the same hash. Hash collisions are used by hackers to hack the blockchain 121.

One of skill in the art would recognize that the blocks (e.g., blocks 201, 202, 303, 304, 305, 500, 501, 502, 503, and/or 600) in the blockchain 121 may be created in different positions within the blockchain 121 based on implementation. For example, the validator block 305 and/or library block(s) 304 may be before the application block 202 in the blockchain 121. In one embodiment, the linker block 303 or the loader block 201 may be at the end of the blockchain 121.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   receive a request to load an application into memory for execution, wherein the application is stored in one or more blocks in a blockchain;
   validate the application in the blockchain by running a blockchain hash;
   in response to validating the application by running the blockchain hash, load the application from the blockchain into a memory;
   execute the application in the memory, and
   in response to not validating the application in the blockchain by running the blockchain hash, add a block to the blockchain that indicates that the hash of the blockchain was not validated.

2. The system of claim 1, wherein the blockchain comprises a validator block that comprises a validator, a genesis block that includes configuration information for loading the application from the blockchain into the memory, and a loader block that includes a loader that loads the application into the memory.

3. The system of claim 2, wherein the application comprises a library that is not stored in the blockchain and wherein the loader uses information stored in the blockchain to validate the library when the library is loaded into the memory for execution with the application.

4. The system of claim 1, wherein the blockchain comprises a linker block and a library block and wherein the linker block is used by a loader to load a library stored in the library block into the memory.

5. The system of claim 1, wherein the blockchain comprises at least one of: a linker block used by a loader to load a library stored in a library block into the memory, a genesis block that includes configuration information for loading the application from the blockchain into the memory; a validator block comprising a validator to validate the application after the application is executed in the memory; and an operating system block comprising an operating system to support execution of the application, and wherein the one or more blocks are linked with the at least one of: the linker block, genesis block; validator block; and operating system block by one or more forward links.

6. The system of claim 5, wherein the blockchain hash is a hash of the application and blockchain comprises at least one of the linker block, validator block; and operating system block.

7. The system of claim 5, wherein the microprocessor uses the one or more forward links to verify a hash of the at least one of: the linker block, genesis block; validator block; and operating system block by one or more forward links.

8. The system of claim 1, wherein the blockchain comprises a first blockchain and a second blockchain, wherein the first blockchain is a loader blockchain that comprises a loader block, and wherein a loader in the loader block is used to load the application from the second blockchain into the memory.

9. The system of claim 1, wherein the application comprises an operating system, wherein the blockchain comprises a genesis block, a loader block, and an operating system block, wherein boot firmware links to the blockchain to load and execute a loader stored in the loader block, and wherein the loader is used to load the operating system into the memory.

10. The system of claim 9, wherein the operating system block comprises one or more driver blocks.

11. The system of claim 1, wherein the application in the one or more blocks in the blockchain comprises an operating system and a first application and wherein the blockchain comprises a loader block, an operating system block, and a first application block.

12. The system of claim 11, wherein a loader in the loader block in the blockchain loads an operating system from the operating system block and a first application from the first application block.

13. The system of claim 1, wherein the application comprises one or more virtual machines and wherein a loader in a loader block in the blockchain loads the one or more virtual machines from the blockchain into the memory.

14. The system of claim 1, wherein the application comprises an operating system and one or more containers, wherein a loader in a loader block in the blockchain loads the operating system and the one or more containers from the blockchain into the memory.

15. A method comprising:
    receiving, by a microprocessor, a request to load an application into memory for execution, wherein the application is stored in one or more blocks in a blockchain;
    validating, by the microprocessor, the application in the blockchain by running a blockchain hash;
    in response to validating the application by running the blockchain hash, loading, by the microprocessor, the application from the blockchain into a memory;
    executing, by the microprocessor, the application in the memory; and
    in response to not validating the application in the blockchain by running the blockchain hash, adding a block to the blockchain that indicates that the hash of the blockchain was not validated.

16. The method of claim 15, wherein the blockchain compromises a loader block that includes a loader that loads the application into the memory, a linker block, a genesis block that includes configuration information for loading the application from the blockchain into the memory, and a library block and wherein the linker block is used by a loader to load the library stored in the library block into the memory.

17. The method of claim 15, wherein the blockchain compromises a loader block that includes a loader that loads the application into the memory, wherein the application comprises a library that is not stored in the blockchain, and wherein the loader uses information stored in the blockchain to validate the library when the library is loaded into the memory for execution with the application.

18. The method of claim 15, wherein the blockchain comprises at least one of: a linker block used by a loader to load a library stored in a library block into the memory, a genesis block that includes configuration information for loading the application from the blockchain into the memory; a validator block comprising a validator to validate the application after the application is executed in the memory; and an operating system block comprising an operating system to support execution of the application, wherein the one or more blocks are linked with the at least one of: the linker block, genesis block; validator block; and operating system block by one or more forward links, and further comprising verifying a hash of the at least one of: the linker block, genesis block; validator block; and operating system block using the one or more forward links.

19. The method of claim 18, wherein the blockchain hash is a hash of the application and the at least one of the linker block, genesis block; validator block; and operating system block comprises at least one of the linker block, validator block; and operating system block.

20. The method of claim 15, wherein the blockchain comprises a validator block that comprises a validator and wherein the validator validates the application after the application is executed in the memory.

21. The method of claim 15, wherein the blockchain comprises a first blockchain and a second blockchain, wherein the first blockchain is a loader blockchain that comprises a loader block, and wherein a loader in the loader block is used to load the application from the second blockchain into the memory.

22. The method of claim 15, wherein the application comprises an operating system, wherein the blockchain comprises a genesis block, a loader block, and an operating system block, wherein boot firmware links to the blockchain to load and execute a loader stored in the loader block, and wherein the loader is used to load the operating system from the operating system block into the memory.

23. The method of claim 22, wherein the operating system block comprises one or more driver blocks.

24. The method of claim 15, wherein the application comprises an operating system and a first application and wherein the blockchain comprises a loader block, an operating system block, and a first application block.

25. The method of claim 24, wherein a loader in the loader block in the blockchain loads an operating system from the operating system block and a first application from the first application block.

26. The method of claim 15, wherein the application comprises one or more virtual machines and wherein a loader in a loader block in the blockchain loads the one or more virtual machines from the blockchain into the memory.

27. The method of claim 15, wherein the application comprises an operating system and one or more containers, wherein a loader in a loader block in the blockchain loads the operating system and the one or more containers from the blockchain into the memory.

28. A non-transient computer readable medium having stored thereon instructions that cause a processor to execute a method, the method comprising:
  instructions to:
  receive a request to load an application into memory for execution, wherein the application is stored in one or more blocks in a blockchain;
  validate the application in the blockchain by running a blockchain hash of the blockchain;
  in response to validating the application by running the blockchain hash, load the application from the blockchain into a memory;
  execute the application in the memory, and
  in response to not validating the application in the blockchain by running the blockchain hash, add a block to the blockchain that indicates that the hash of the blockchain was not validated.

* * * * *